Patented Mar. 1, 1949

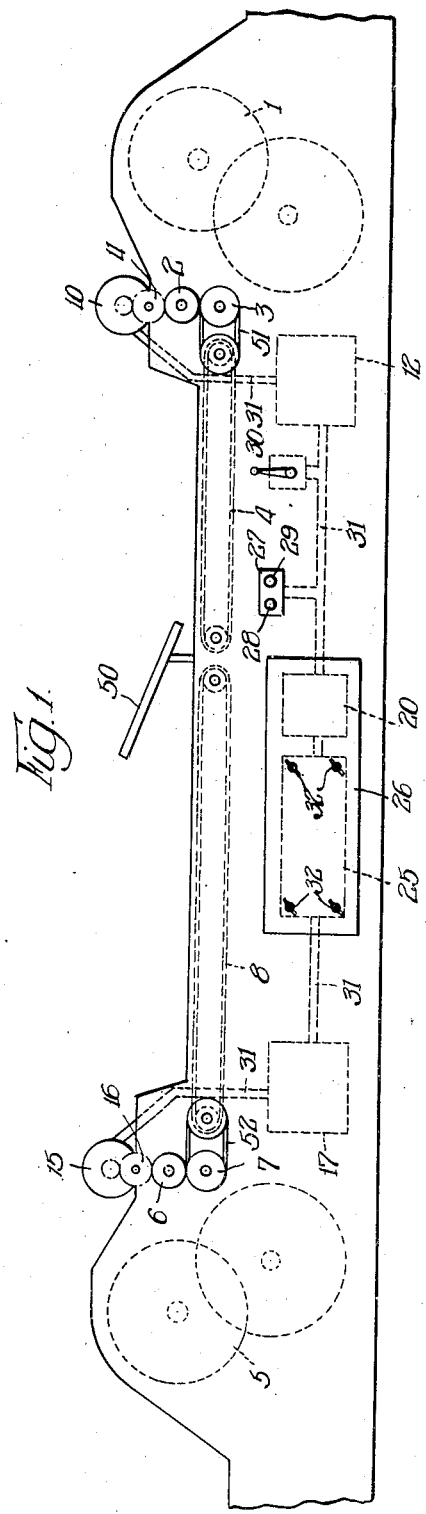
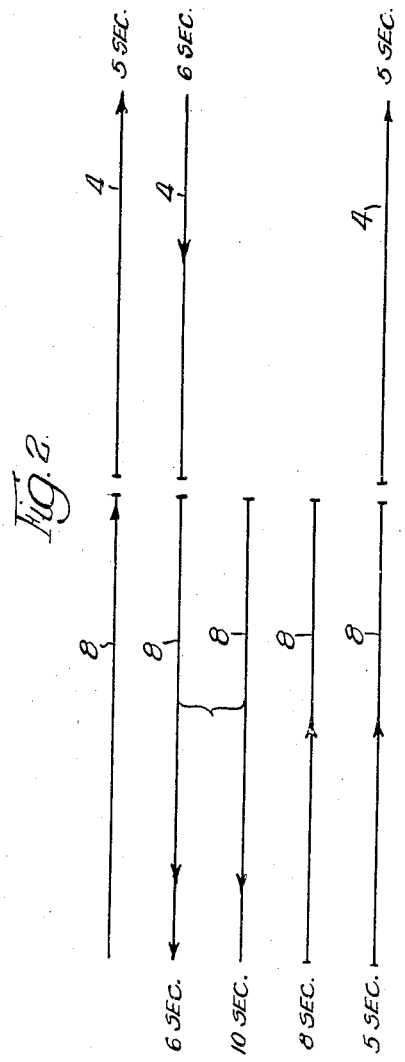

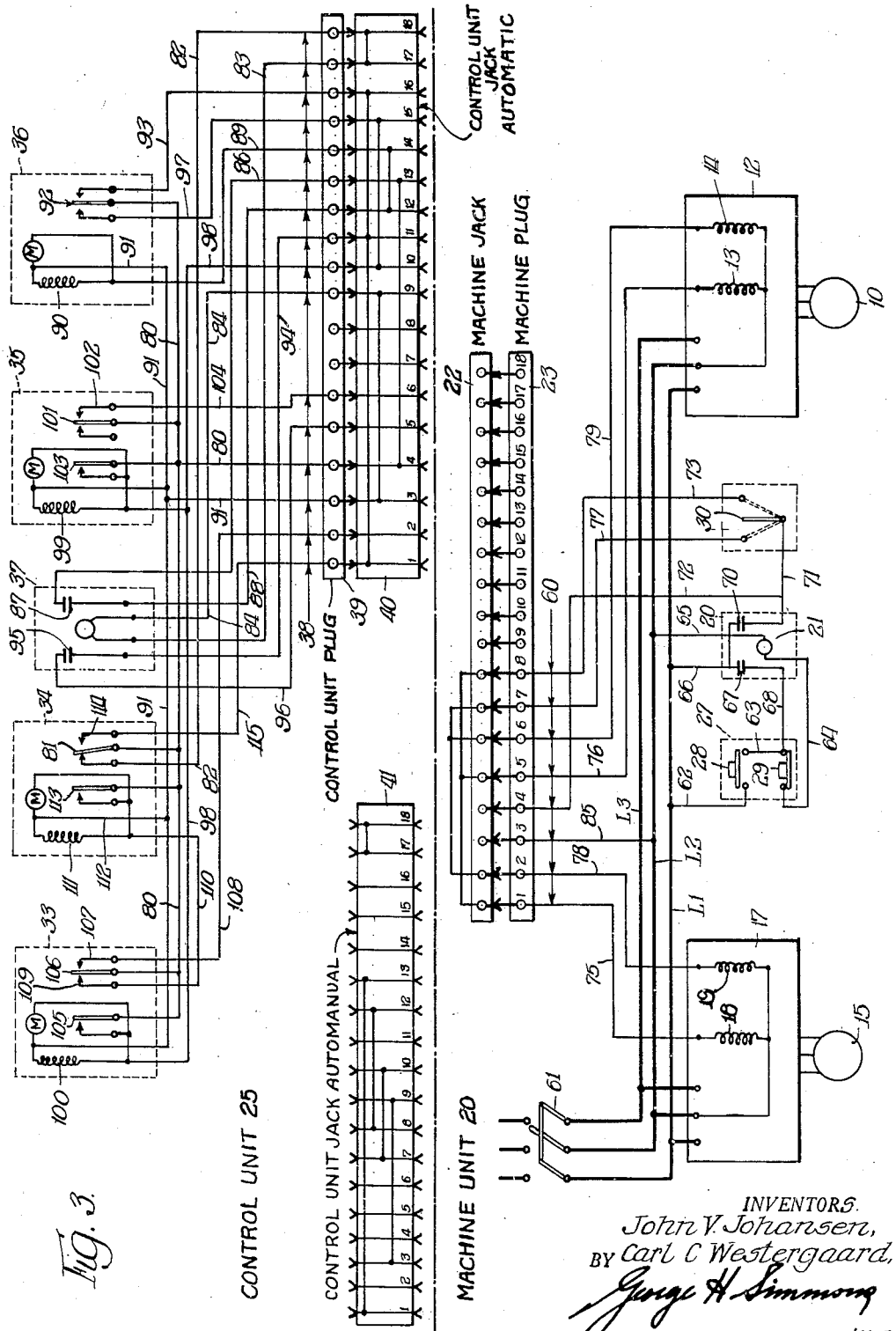

2,463,278

UNITED STATES PATENT OFFICE 2,463,278

CONTROL MECHANISM FOR DECORTICATING MACHINES

John V. Johansen and Carl C. Westergaard, Chicago, Ill.; said Westergaard assignor to said Johansen Application November 1, 1945, Serial No. 626,064

6 Claims. (Cl. 19—32)

This invention relates to control mechanisms for decorticating machines and has for its principal object the provision of a new and improved mechanism of this type.

It is a main object of the invention to provide a control mechanism for decorticating machine that is arranged to operate the machine automatically through a predetermined cycle of sequential operations.

Another object of the invention is to provide a control unit containing arrangements for permitting certain ones of a plurality of the operations of a cycle to be performed under manual control.

Still another object of the invention is to provide a control unit which when arranged for operation under a combination of manual and automatic control renders the manual control inoperative until the automatically controlled part of a previous cycle has been completed.

Still another object of the invention is to provide a control unit in which each of the several individual operations comprising the cycle can be lengthened or shortened at will.

Still another object of the invention is to provide a control unit for decorticating machines which is readily removable from the machine for adjustment and maintenance as required.

Still another object of the invention is to provide a control unit which can be manufactured, operated and maintained at low cost.

Further objects of the invention not specifically mentioned here will be apparent from the detailed description and claims which follow, reference being had to the accompanying drawings in which a preferred embodiment of the invention is shown by way of example, and in which:

Figure 1 is a side elevational view of the decorticating machine showing the application of the invention thereto;

Figure 2 is a diagrammatic illustration of the cycle of operation through which the machine is to be run; and Figure 3 is a schematic circuit diagram of the control and machine units.

Machines for decorticating fibrous materials such as hemp are old in the prior art. In the co-pending application of Johansen, Serial No. 506,950, filed October 20, 1943, now Pat No. 2,391,977, Jan. 1, 1946, there is shown a method of decorticating hemp wherein the stalks are moved first in a forward direction to decorticate approximately one-half of the stalk, which movement is then reversed and continued in a reverse direction to free the decorticated part of the stalk from the decorticator and to move the undecorticated part of the stalk into contact with a second decorticator, after which the movement of the material is again reversed to remove the same from the second decorticator. The present invention applies to machines operating under the cycle of operations set forth in this co-pending application.

Illustrated in Figure 1, by way of example, is a machine comprising a suitable framework in one end of which is mounted a primary decorticator 1, and associated feed rolls 2 and 3. Adjacent these feed rolls is a primary conveyor 4 suitably mounted upon the framework of the machine.

In the opposite end of the machine is a secondary decorticator 5 and associated feed rolls 6 and 7, and adjacent said feed rolls is a secondary conveyor 8.

Many decorticating mills are located in regions where electrical power is available only in very limited quantity, if at all, and in such cases the decorticators 1 and 5 will be driven by suitable belt connections, not shown, to a common power shaft which in turn is driven by centralized power, usually a steam engine. In such cases feed rolls 2 and 3 and 6 and 7, and conveyors 4 and 8 may be driven mechanically by the same source of power with suitable reversible mechanisms, such as clutches interposed between the driving and driven units. In other instances, although there is not sufficient electrical power available to drive the decorticators, there is sufficient power to permit driving the feed rolls and conveyors by suitable reversible electric motors. The control unit of the present invention is applicable both to electrically and mechanically driven feed and conveying mechanisms.

As shown in Figure 1, feed rolls 2 and 3 are geared together and are driven by a source of power 10, through a suitable speed reducing gear 11. Mounted upon the framework of the machine, preferably under the conveyor 4, is a control unit 12, through which the operation of the source of power 10 is controlled. The particular type of control unit will, of course, depend on the type of power being used. There are available control units for reversible electric motors of all kinds, that is, both direct current and alternate current of single or multiple phase. There are also available electro-magnetic clutch mechanisms and electro-magnetically controlled pneumatic and hydraulic clutch operating mechanisms. In all cases the control units are provided with an electro-magnet such as 13, Figure 3, which, when operated causes the source of power to move the feed rolls in one direction, and the second electro-magnet 14, which, when operated causes the source of power to move the feed rolls in an opposite direction. So long as these conditions are met, the particular construction of the control unit 12 is not of the essence of the present invention.

Also, mounted upon the framework of the machine and adjacent the feed rolls 6 and 7 is a second source of power 15 that is connected to the feed rolls by a suitable speed reducing gear 16, the source of power 15 being controlled by a second controller 17 which is identical with the controller 12 and contains an electro-magnet 18, operable to cause the source of power 15 to drive the end rolls 6 and 7 in one direction, and an electro-magnet 19, operable to cause the source of power to drive these rolls in an opposite direction.

Also mounted upon the framework of the machine and near the front or operating side thereof, is a machine control panel 20 which contains a relay 21, a machine jack 22 and a machine plug 23. Mounted in close proximity to the machine control panel 20 is the control unit panel 25. Since hemp mills are frequently quite dusty, preferably control panels 20 and 25 are housed in a virtually dustproof box closed by a door 26 on the front or operating face of the machine.

Also located on the front face of the machine is a start-stop control unit 27 which includes a start button 28 and a stop button 29. Also located on the operating front of the machine is a manual control lever 30. Control units 12 and 17 are connected to their respective sources of power and the control panels by connections extending through conduits indicated generally at 31, as are the start and stop buttons and the manual control lever, which arrangement renders the entire control system of the machine fully protected from dust.

The control unit panel consists preferably of a suitable base or panel mounted upon the framework of the machine by means such as wing nuts 32, which permit ready removal of the panel from the machine. Mounted upon this panel are a plurality of timing relays 33, 34, 35 and 36 and a control relay 37. These relays are inter-connected by suitable wires which run through a cable 38 to the control unit plug 39.

Also mounted upon the panel 25 is a control unit jack 40, which in reality is a double jack arranged to receive the control unit plug 39 on one side, and to receive the machine plug 23 on the other side. The various contacts of the jack 40 are cross-connected so that when plugs 39 and 23 are connected thereto full automatic operation of the machine will result, as will presently appear.

Also mounted upon the control panel 25 is a second jack 41 which is similar to jack 40 in that it is a duplex jack adapted to receive the plug 39 and also the plug 23, and the contacts of jack 41 are cross-connected so that when these plugs are registered with the jack, circuits are prepared to operate the machine under auto-manual control, that is—partly by manual control and partly by automatic control, as will presently appear.

These are a number of gang plugs and jacks which are suitable for use herein and which are available on the open market, and the particular details of construction of these plugs and jacks are not of the essence of the present invention.

Timing relays 33 to 36 inclusive are provided with circuit closing contacts and electro-magnets, through which those contacts are closed and maintained closed for a predetermined interval of time. At the end of that time the contacts are opened and other contacts closed momentarily, at least, to initiate the next step in the cycle of operation. The interval of time during which the control contacts are maintained closed is adjustable. There are a number of timing relays available on the open market which are suitable for this purpose, and the particular details of construction thereof are not of the essence of the present invention. Relays such as are shown in the Patent 2,175,865, issued to C. L. Anderson, October 10, 1939, have been found to be satisfactory for this purpose, when the source of power is alternating electric current, and the drawings illustrate this relay by way of example.

In the operation of the machine shown in Figure 1, decorticators 1 and 5 are operated continuously at uniform speed of approximately 200 revolutions per minute. Material to be decorticated is placed upon the conveyor 4 extending to the left over the bracket 50, which holds it out of engagement with the conveyor 8. When the source of power 10 operates to drive the feed roll 2 in a counterclockwise direction and the feed roll 3 in a clockwise direction, the conveyor 4 will be moved to the right through the action of the driving chain 51, thereby feeding the material between the feed rolls and into the decorticator, the material traveling to the right—Figure 1. This movement pulls the trailing ends of the material down off of the bracket 50, down onto the conveyor 4.

At the completion of this first step in the cycle of operations, the direction of movement of the feed rolls and conveyor is reversed and simultaneously source of power 15 is operated to rotate feed roll 6 in a clockwise direction, and feed roll 7 in a counter-clockwise direction, conveyor 8 being moved to the left by this rotation of feed roll 7, through the action of driving chain 52. It will be noted here that during the first step in the cycle of operation, as will be seen in Figure 2, conveyors 8 and 4 are both moved to the right for a definite period of time—say about 5 seconds. During the second step in the cycle of operation, both conveyors 8 and 4 are moved to the left for a definite period of time—say 6 seconds, for example. During the third step in the cycle, conveyor 4 is standing still and conveyor 8 continues in its movement to the left, moving the material off of the conveyor 4 and into engagement with the decorticator 5. This third step in the cycle is somewhat longer than the preceding steps, continuing for say—10 seconds. During the fourth step in the cycle, conveyor 4 is also stopped and conveyor 8 is moving to the right, this step in the cycle continuing for say— 8 seconds.

During the third and fourth steps in the cycle conveyor 4 being stopped, the attendant of the machine can spread a new batch of material on it and over the bracket 50 without interfering with the previous batch. At the end of the fourth step the machine moves into the fifth step in the cycle, which is the same as the first, conveyor 8 moving to the right to complete the removal of the first batch of material from the decorticator 5, and conveyor 4 moving to the right to bring the second batch of material into engagement with the decorticator 1. The foregoing cycle is continued so long as the machine continues in operation.

Manual operation

When it is desired to operate the machine under manual control, plug 23 is registered with jack 22 on the machine panel 20, the plug being connected to the instrumentalities by cable 60 to permit this connection. Main switch 61 is closed to supply power to the machine and decorticators 1 and 5 are started in motion. Push button 28 is operated thereby to close a circuit from line conductor L—1, conductor 62, through the push button contacts 28, conductor 63, push button contacts 29, conductor 64, through the winding of relay 21, conductor 65, to line L—2. Relay 21 operates over this circuit and locks itself over a circuit which may be traced from L—1, conductor 66, relay contact 67, conductor 68, push button contacts 29, conductor 64, through the winding of the relay 21 and conductor 65 to L—2. Relay 21 upon operating also closes contacts 70, thereby extending a circuit from L—1 through conductor 66 and conductor 71, to the manual control lever 30, with a branch extending through conductor 72 to the plug and jack contact 4.

As soon as the attendant has spread a batch of material on the conveyor 4 as above, the operator moves control lever 30 to the right, thereby extending the previously traced circuit from L—1 through conductor 73, plug and jack contact 8, which is cross-connected to contacts 1 and 5 so that the circuit branches over parallel paths, one leading through jack and plug contact 1, conductor 75, through the winding of controller magnet 18 to L—2, and the other leading through plug and jack contact 5, conductor 76, through the winding of controller magnet 13 to L—2. Controllers 12 and 17 operate to cause their associated power devices, 10 and 15 respectively, to drive conveyors 4 and 8 to the right, Figure 2, for the first step in the cycle of the machine. This movement continues until the operator moves the manual control lever 30 away from the contact to which conductor 73 is connected.

When the operator desires to reverse the direction of the travel of the conveyors, he moves manual control lever 30 to the left, thereby extending the previously traced circuit from conductor L—1, over conductor 77, plug and jack contacts 7, which are cross-connected to contacts 2 and 6 so that the circuit branches over parallel paths, the one leading through plug and jack contact 2, conductor 78, through the magnet 19 to L—2—and the other through plug and jack contact 6, conductor 79, through the magnet 14 to L—2. These magnets operate over these circuits causing sources of power 10 and 15 to operate in a reverse direction for the second step in the cycle, as shown in Figure 2. This movement continues as long as lever 30 remains in contact with conductor 77. The foregoing cycle of operations is repeated by movement of the control lever 30 and the machine is stopped to permit removing the decorticated material and putting on of a new batch of material by moving the lever into the neutral position in which it is shown.

Automatic operation

Manual operation may be advantageous when the material being decorticated varies greatly in length. When the material is of uniform length greater production by the machine can be secured through automatic operation. To accomplish this the plug 23 is removed from the jack 22 and connected with jack 40 and plug 39 is also connected to jack 40. A group of material is placed upon the conveyor 4 and push button 28 is operated as before to operate relay 21 which locks in operated position. Then the circuit previously traced from line L—1 over conductor 72 to jack 4 is extended over conductor 80, through spring 81 of relay 34 and its normally closed contact, conductor 82, contact 18 of plug and jack 39 and 40, which contact is cross-connected to contact 17, conductor 83, through the winding of magnet of relay 37, conductor 84, contact 9 of plug and jack 39 and 40, which is cross-connected to contact 3 and extended through plug and jack contacts 3 of plug 23 and jack 40, conductor 85 to L—2. Relay 37 operates over this circuit, extending a circuit from the L—1 connection previously traced to jack 4 of plug 23 and jack 40 which is cross-connected to contact 13 thereof, conductor 86, contacts 87 of relay 37 now closed, conductor 88, contact 12 of plug 39 and jack 40, which is cross-connected to contact 14 thereof, conductor 89 through the winding of the magnet 90 of relay 36, with a parallel branch leading through the motor M of this relay, thence over conductor 91, contact 3 of plugs 39 and 23 and jack 40, and conductor 85 to line L—2.

The magnet 90 is energized over this circuit and operates to move spring 92 to the right against its make contact, motor M also operating over this circuit to maintain this contact closed for a definite period of time, as explained in the above mentioned Anderson patent. A circuit may now be traced from L—1 connection previously traced to conductor 80, spring 92, its make contact, conductor 93, contacts 16 of plug and jack 39 and 40 which is cross-connected to jack contacts 11 and 1 thereof. This circuit extends through contact 1 of plug 23 and conductor 75 through the winding of magnet 18 to L—2 and through contact 11 of plug 39, conductor 94, through contacts 95 of relay 37, conductor 96, contact 5, plug 39, jack 40 and plug 23, conductor 76 through the winding of magnet 13 to L—2. Magnets 13 and 18 operate over these circuits to cause sources of power 10 and 15 to move conveyors 4 and 8 to the right as before.

Motor M of relay 36 times out of the relay in the definite time for which the relay is set. We assume that this time is 5 seconds. Spring 92 is then moved away from its make contact to break the above circuits for magnets 13 and 18 which de-energize, thereby to bring the conveyors 4 and 8 to rest. Spring 92 is momentarily moved to the left into engagement with its break contact, thereby extending the circuit from L—1 on the spring 92, conductor 97, contact 15 of plug and jack 39 and 40, which is cross-connected to contact 19 thereof, conductor 98, thence over parallel paths, the first leading through the winding 99 of relay 35 with a multiple path through the motor M of this relay to the L—2 connection previously traced to conductor 91, with the second branch of this circuit extending through the magnet 100 of relay 33 with a parallel branch through the motor M thereof to the previously traced L—2 connection on conductor 91.

Relay 35 operates over this circuit to move its main spring 101 into contact with its make contact 102 and to move its main spring 103 into contact with its make contact, thereby establishing a locking circuit from conductor 89, in lieu of the previously traced circuit through spring 92. Spring 101 extends a circuit through conductor 80, spring 102, conductor 104, contact 6 of plugs 39 and 23 and jack 40, conductor 79 through the winding of magnet 14 of controller 12 to L—2, this magnet energizing over this circuit to operate source of power 10 to move conveyor 4 to the left. Simultaneously relay 33 operates, closing its main spring 105 against its make contact to establish a locking circuit to conductor 80. Spring 106 of relay 33 moving against its make contact 107 extends a circuit from conductor 80 through conductor 108, contact 2 of jack 40 and plugs 39 and 23, conductor 78 through magnet 19 to L—2. Magnet 19 operates over this circuit operating source of power 15 to move conveyor 8 to the left, thereby operating the machine in the second step in its cycle of operations.

Relay 35 times out to mark the end of the second step in the cycle and the beginning of the third, after a definite interval of time—assumed to be 5 seconds. When this relay times out contacts 103 are opened, thereby to break the locking circuit for the magnet and motor and spring 101 moves out of engagement with contact 102 and momentarily into engagement with the contact disposed at the left of spring 101 without effect, since that contact is not connected to anything. Breaking the source of power to the relay 35, as above, causes that relay to restore to normal in a manner fully explained in the above Anderson patent.

Relay 33 maintains itself in operated position during the third step in the cycle to keep conveyor 8 moving to the left for an additional interval of time, assumed to be 10 seconds. At the end of this step motor M of relay 33 times the relay out, opening contacts 105 to open the locking circuit for the magnet 100 and the motor and moving spring 106 away from contact 107 and into momentary engagement with contact 109, thereby extending a circuit from the L—1 connection on spring 106 through contact 109, conductor 110, through the winding 111 of relay 34, with a parallel path through the motor M thereof, conductor 112 to the previously traced L—2 connection on conductor 91.

Opening the contacts 106 and 107 opens the previously traced circuits for magnet 19, bringing the conveyor 8 to rest. Energization of magnet 111 closes the circuit from conductor 80 through spring 113 and its make contact to lock magnet 111 in operated position. Energization of this magnet also moves spring 81 away from its break contact, thereby opening the previously traced circuit for the magnet of relay 37 which falls back and at contacts 87 opens the previously traced circuit for the magnet 90 of relay 36, whereupon relay 36 restores itself to normal.

Spring 81 moving into engagement with its make contact 114 closes a circuit from L—1 on conductor 80 through conductor 115 to contact 1 of jack 40 and plugs 39 and 23, conductor 75, through the winding of magnet 18 to L—2, energizing that magnet which operates to cause the source of power 15 to drive the conveyor 8 to the right, thereby initiating the fourth step in the cycle of operation.

Relay 34 maintains its circuits closed for a definite period of time—say 8 seconds—at the end of which its motor times the relay out, opening contacts 113 to break the locking circuit of the magnet 111 and the motor, thereby restoring the relay to normal and closing main spring 81 against its normally closed contact, thereby to re-establish the previously traced circuit for relay 37 which re-operates to establish the previously traced circuit for relay 36. Relay 36 operates to initiate another cycle of operations, it being assumed that the attendant has placed a second batch of material on the conveyor 4 during the third and fourth steps in the previous cycle—that is, while the conveyor is at rest.

*Auto-manual operation*

Oftentimes the length of the stalks of material will vary sufficiently that it will be advantageous to employ a combination of manual and automatic control for the machine, thereby to obtain optimum production from the machine. To accomplish this plug 39 is removed from jack 40 and inserted in jack 41, and plug 23 is likewise inserted in jack 41.

Main switch 61 is closed as before to supply power to the machine and push button 28 is operated to energize relay 21, which locks as before. A circuit may now be traced from L—1 connection on conductor 72 through contact 4 of plug 23, jack 41, plug 39 to conductor 80, spring 81 and its normally closed contact, conductor 82, contact 18 of plug 39 and jack 41, which is cross-connected to contact 17 thereof, conductor 83 through the winding of magnet 37, conductor 84, contact 9 of plug 39, jack 41 and plug 23 which is cross-connected to contact 3 thereof, conductor 85 to L—2. Relay 37 energizes over this circuit to prepare the machine for the first step in the cycle.

As soon as the operator is ready he moves control lever 30 to the right, thereby extending the previously traced circuit from L—1 to lever 30, through conductor 73, contact 8 of plug 23, jack 41 and plug 39, which is cross-connected to contacts 11 and 12 thereof, the circuit extending through parallel paths—the one through contact 11 of jack 41 and plug 39, conductor 94 through the contacts 95 of relay 37, now closed, conductor 96, contact 5 of plug 39, jack 41 and plug 23, conductor 76, through the winding of magnet 13 to L—2. Magnet 13 operates over this circuit to cause conveyor 4 to be moved to the right as before. The second branch of this circuit extends through contact 12 of jack 41 and plug 39, conductor 88, contacts 87 of relay 37 now closed, conductor 86, contact 13 of plug 39 and jack 41 which is cross-connected to contact 1 thereof through contact 1 of plug 23, conductor 75, through magnet 18 to L—2. Magnet 18 operates over this circuit to cause conveyor 8 to be moved to the right as before.

So long as control lever 30 is moved to the right the foregoing circuits for magnets 13 and 18 will be maintained and the conveyors moved to the right. As soon as the operator sees that a sufficient portion of the material has been decorticated he moves the lever to the left, breaking the above circuits and bringing the conveyors to rest to complete the first step in the cycle of operation.

To initiate the second step in the cycle the operator moves the control lever to the left, extending a circuit from L—1 over conductor 77, contacts 7 of plug 23, jack 41, which is cross-connected to contact 18 thereof, the circuit extending through contact 18 of plug 39, conductor 98, through the winding of magnet 99 of relay 35, with a parallel branch through the motor M thereof to the L—2 connection on conductor 91.

Relay 35 operates over this circuit locking itself in operated position as before. The circuit just traced to conductor 98 is also extended through the winding 100 of the magnet of relay 33, with a parallel branch through the motor M thereof to the L—2 connection on conductor 91. Relay 33 operates over this circuit locking itself in operated position as before. The operator may then restore the control lever 30 to neutral without effect.

Relay 35 upon operating extends a circuit from L—1 on conductor 80, spring 101, contact 102, conductor 104, contact 6 of plug 39 and jack 41 and plug 23, conductor 79, through magnet 14 of controller 12 to L—2, operating that magnet to cause conveyor 4 to be moved to the left as before.

Relay 33 upon operating extends the L—1 connection on conductor 80 through spring 106 and contact 107, conductor 108, through contact 2 of plug 39, jack 41, plug 23, conductor 78, magnet 19 of controller 17, to L—2. Magnet 19 operates over this circuit causing conveyor 8 to be moved to the left as before.

The circuits just traced for magnets 14 and 19 will be maintained until relays 35 and 33 time out as before, relay 35 preferably timing out after a relatively short interval—say 5 seconds— to bring conveyor 4 to rest, thereby completing the second step in the cycle, and relay 33 timing out after a longer interval to keep conveyor 8 moving to the left for the third step in the cycle.

As soon as conveyor 4 comes to rest the attendant can begin placing another batch of material thereon.

When relay 35 times out, stopping of conveyor 4 is the only result. When relay 33 times out the previously traced circuit for the magnet 111 of relay 34 is closed and this relay operates to lock itself through contacts 113 as before. Relay 34 also breaks the circuit for relay 37, causing that relay to restore and at contacts 87 and 95 open points in the previously traced circuit through control lever 30. As soon as the attendant gets the conveyor 4 reloaded he moves control lever 30 to the right to initiate a new cycle of operations, but nothing happens until relay 37 is again in operated position.

The operation of relay 34 closes a circuit from conductor 80 through spring 81, contact 114, conductor 115, contact 1 of plug 39, jack 41 and plug 23, conductor 75 through magnet 18 to L—2. Magnet 18 operates over this circuit to cause conveyor 8 to be moved to the right as before to initiate the fourth step in the cycle.

When relay 34 times out after say 8 seconds, its locking circuit is opened as before and the relay restored to normal, the circuit for magnet 18 is opened by the movement of spring 81 away from contact 114, and the previously traced circuit for relay 37 is re-established by spring 81 moving into engagement with its normally closed contact. Relay 37 operates and if the operator of the machine is ready to initiate a new cycle and has moved control lever 30 into engagement with the contact to which conductor 73 is connected, conveyors 4 and 8 will be moved to the right in the fifth step of the cycle, which step is the first step in a new cycle. Thus it will be seen that with plugs 39 and 23 connected with jack 41, the initial step in the cycle continues as long as the operator desires to have it continue and the other steps in the cycle when normally initiated by the momentary movement of lever 30 to the left, are continued through timed intervals under the control of timing relays 33, 34 and 35. The control of the initial step in the cycle is under joint control of the manual lever 30 and relay 37, insuring that the operator will not initiate a new cycle before the previous cycle has progressed to a point where its last step may be concluded during the first step of the new cycle.

When the machine is operating under either automatic or auto-manual control, various relays such as 33, 34 and 35 of the control unit are locked in operated position through relay 21 of the machine unit. If, for any reason, it becomes necessary to stop the machine before the end of a cycle, the operator presses the stop button 29, thereby opening the locking circuit for relay 21, permitting that relay to restore and remove the L—1 connection from conductor 72, and thereby from conductor 80. The relays that are locked to conductor 80 will thereby be restored and circuits to magnets 13, 14, 18 and 19 will be opened and bring the conveyors to rest.

From the foregoing it will be apparent that the control unit of the present invention enables a decorticating machine, for example, to be operated under full manual control, full automatic control and also under a combination of manual and automatic control. When under this combination of controls the manual part of the control is rendered ineffective until the automatically controlled part of the cycle has been completed.

Automatic and semi-automatic control are accomplished by relatively simple, inexpensive standard equipment available upon the open market. This equipment is mounted as a unit in such a manner as to permit a faulty unit to be quickly removed from the machine and replaced by an operative unit so that interruption of the operation of machine is minimized. Plug and jack connections permit quick change-over from one type of operation to another, and also permit ready removal of the control unit from the machine without making it necessary to disconnect numerous wires. The control mechanism being unitary in nature, lends itself readily to adequate protection from dust and dirt which are, or may be, quite prevalent in the mill in which the machine is located.

While we have chosen to illustrate our invention by showing and describing a preferred embodiment of it, we have done so by way of example only, as there are many modifications and adaptations which can be made by one skilled in the art within the teachings of the invention.

Having thus complied with the statutes and described a preferred embodiment of our invention, what we consider new and desire to have protected by Letters Patent, is pointed out in the appended claims.

What is claimed is:

1. The combination with a decorticating machine having two reversible motors, a controller for each motor and a conveyor and a pair of feed rolls operatively connected to each motor, of a control unit for said machine comprising a first timing relay operable to actuate both of said controllers to operate both of said motors in a forward direction, a second timing relay operable to actuate one of said controllers to operate one of said motors in a reverse direction, a third timing relay operable to actuate the second of said controllers to operate the second motor in a reverse direction, circuit means closed by said first timing relay to initiate operations of said second and third timing relays, a fourth timing relay operable to operate the second of said controllers to operate the second motor in a forward direction, circuit means closed by said third timing relay to initiate an operation of said fourth timing relay, and circuit means closed by said fourth timing relay to initiate an operation of said first timing relay.

2. A control unit as claimed in claim 1, characterized in that each timing relay on operating actuates a controller for a predetermined interval of time, at the end of which interval the circuit means closed by the first, third and fourth relays respectively are closed momentarily to initiate an operation of the succeeding timing relay.

3. The combination with a decorticating machine having two reversible motors, a controller for each motor, and a conveyor and feed rolls geared to the motor, of a control unit for the machine comprising, a first timing relay operable to actuate both controllers to operate both motors in a forward direction and to maintain said motors in operation for a predetermined interval of time and then to stop them, a second timing relay operable to actuate a first controller to operate the first motor in a reverse direction and to maintain said motor in operation for a predetermined interval of time and then to stop it, a third timing relay operable to actuate the second controller to operate the second motor in a reverse direction and to maintain said motor in operation for a predetermined interval of time and then to stop it, a circuit for actuating said second and third timing relays closed by said first timing relay as said first motor is coming to a stop, a fourth timing relay operable to actuate said second controller to operate the second motor in a forward direction and to maintain said motor in operation for a predetermined interval of time and then to stop it, a circuit for actuating said fourth timing relay closed by said third timing relay as said second motor is coming to a stop from said reverse direction, and a circuit for actuating said first timing relay closed by said fourth timing relay as said second motor is coming to a stop from said forward direction.

4. The combination with a decorticating machine having two reversible motors each driving a pair of feed rolls and a conveyor belt, a controller for each motor, conductors leading out of said controllers, a machine plug in which said conductors terminate, a manual control lever, conductors leading from said lever and terminating in said plug, a machine jack, and cross connections on said jack arranged so that when the plug is registered with the jack circuits are extended through the manual lever in right position to the controllers to actuate the controllers to operate both conveyors to the right and circuits are extended through the manual lever in left position to the controllers to actuate the controllers to operate both conveyors to the left, of a control unit detachably mounted on said machine and comprising four timing relays and a control relay, conductors extending from said relays, a control unit plug in which said conductors terminate, a first control unit jack with which said machine plug and said control unit plug may both be registered, cross connections on said first jack control unit arranged so that a first one of said timing relays on operating extends circuits to both of said controllers to actuate them to move both conveyors to the right and so that each of the other three timing relays extend circuits to but one controller to actuate that controller to move the associated conveyor in one direction and so that the first, third and fourth timing relays close circuits each to succeeding timing relays to actuate those relays, a second control unit jack with which the control unit plug and the machine plug may be registered, and cross connections on said second jack arranged so that said manual lever in right position extends circuits to both controllers to operate both conveyors to the right and in left position initiates an operation of two of the last three of said timing relays to operate said conveyors in one direction and then initiates an operation of the fourth timing relay to operate one of said conveyors in a forward direction.

5. A control unit as claimed in claim 3, characterized in that said manual lever is rendered ineffective during an operation of said fourth timing relay.

6. A control unit as claimed in claim 3, characterized in that each timing relay maintains closed a circuit to an associated controller for a predetermined time that is variable within the relay.

JOHN V. JOHANSEN.
CARL C. WESTERGAARD.

REFERENCES CITED

The following references are of record in the file of this patent:

UNITED STATES PATENTS

| Number | Name | Date |
|---|---|---|
| 524,573 | Boeken | Aug. 14, 1894 |
| 2,029,335 | Oberhoffken et al. | Feb. 4, 1936 |
| 2,207,407 | Kane | July 9, 1940 |

Certificate of Correction

Patent No. 2,463,278. March 1, 1949.

JOHN V. JOHANSEN ET AL.

It is hereby certified that errors appear in the printed specification of the above numbered patent requiring correction as follows:

Column 12, line 32, claim 5, and line 36, claim 6, for the claim reference numeral "3" read *4*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*